US011297049B2

(12) United States Patent
Schwarz

(10) Patent No.: US 11,297,049 B2
(45) Date of Patent: Apr. 5, 2022

(54) LINKING A TERMINAL INTO AN INTERCONNECTABLE COMPUTER INFRASTRUCTURE

(71) Applicant: SIEMENS AKTIENGESELLSCHAFT, Munich (DE)

(72) Inventor: Robert Schwarz, Zirndorf (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 17/253,614

(22) PCT Filed: May 16, 2019

(86) PCT No.: PCT/EP2019/062588
§ 371 (c)(1),
(2) Date: Dec. 17, 2020

(87) PCT Pub. No.: WO2019/242947
PCT Pub. Date: Dec. 26, 2019

(65) Prior Publication Data
US 2021/0281562 A1 Sep. 9, 2021

(30) Foreign Application Priority Data
Jun. 20, 2018 (EP) .................... 18178775

(51) Int. Cl.
H04L 29/06 (2006.01)
(52) U.S. Cl.
CPC ........ H04L 63/0823 (2013.01); H04L 63/083 (2013.01)
(58) Field of Classification Search
CPC ... H04L 63/0823; H04L 63/083; H04L 67/12; H04L 63/0209; H04L 9/006;
(Continued)

(56) References Cited

U.S. PATENT DOCUMENTS 10,447,683 B1 * 10/2019 Loladia ................. H04W 12/63
2003/0196084 A1 * 10/2003 Okereke ............... H04W 12/06
713/156
(Continued)

FOREIGN PATENT DOCUMENTS

| CN | 104322038 A | 1/2015 |
| CN | 104584507 A | 4/2015 |
| CN | 106489284 A | 3/2017 |

OTHER PUBLICATIONS

Sujuan Li et al., "Certificate-based Smooth Projective Hashing and Its Applications," International Journal of Network Security, vol. 20, No. 2, pp. 266-277, Mar. 2018. (Year: 2018).*
(Continued)

Primary Examiner — Luu T Pham
Assistant Examiner — Canh Le
(74) Attorney, Agent, or Firm — Lempia Summerfield Katz LLC

(57) ABSTRACT

The invention relates to a method for linking a terminal (1) into a region (4a) of an interconnectable computer infrastructure (2) which is designed for a plurality of users (6, 6a), said region being allocated to a user (6a). A user certificate (12a) is generated for the region (4a) allocated to the user (6a) and is provided to the user (6a) and/or the interconnectable computer infrastructure (2). A terminal certificate (16a) which is compatible with the user certificate (12a) is generated, and the terminal certificate (16a) is entered into the terminal (1). The terminal (1) is registered in the interconnectable computer infrastructure (2) via a data connection (20), wherein the terminal certificate (16a) and/or a password which is encrypted using the terminal certificate (16a) is transmitted from the terminal (1) to the interconnectable computer infrastructure (2) via the data connection (20) for the registration process. The terminal (1) is authenticated by checking the compatibility of the trans-
(Continued)

mitted terminal certificate (16a) or the transmitted password encrypted using the terminal certificate (16a) with the user certificate (12a) in the interconnectable computer infrastructure (2), and in the event of a successful authentication for the terminal (1), the use of the interconnectable computer infrastructure (2) is released in the region (4a) allocated to the user (6a).

11 Claims, 1 Drawing Sheet

(58) Field of Classification Search
CPC ... H04L 9/3263; H04L 9/3226; G06F 21/335; G06F 21/33; H04W 12/069
See application file for complete search history.

(56) References Cited

U.S. PATENT DOCUMENTS

| | | | | |
|---|---|---|---|---|
| 2006/0242405 | A1* | 10/2006 | Gupta | H04L 63/0823 713/156 |
| 2014/0208390 | A1* | 7/2014 | Brown | G05B 11/01 726/4 |
| 2015/0215301 | A1 | 7/2015 | Fischer | |
| 2016/0112406 | A1 | 4/2016 | Bugrov | |
| 2016/0134621 | A1 | 5/2016 | Palanigounder | |
| 2017/0318018 | A1 | 11/2017 | Huang et al. | |
| 2018/0351944 | A1* | 12/2018 | Cho | H04L 9/3228 |

OTHER PUBLICATIONS

Mengbo Hou, "An Efficient Certificate Revication and Verification Schemen from Multi-Hashing," Journal of Computers, vol. 7, No. 6, Jun. 2012. (Year: 2012).*

Chinese Office Action for Chinese Application No. 201980041243.0 dated Jul. 7, 2021.

Carstens Jürgen: "User authorization on protective devices using a role and rights structure and the assignment of these using the parameterization device", Siemens AG; Ip.com Journal, Ip.com Inc., West Henrietta, NY, US, XP013124895, ISSN: 1533-0001, abstract; fig. 1, 2, 3; pp. 1-2; 2008; with machine translation.

International Search Report and the Written Opinion for International Patent Application PCT/EP2019/062588 dated Jul. 29, 2019, with translation.

* cited by examiner

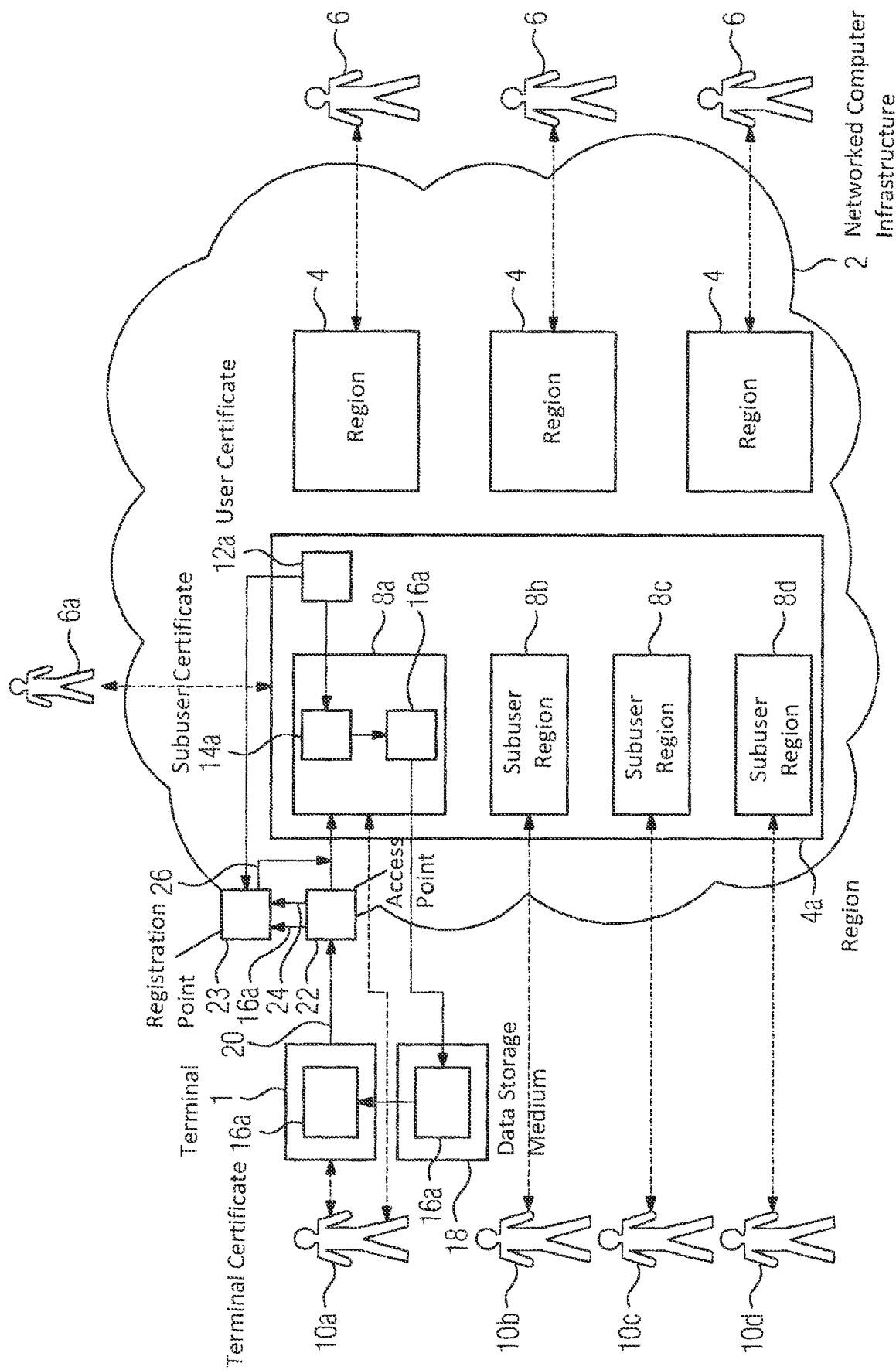

LINKING A TERMINAL INTO AN INTERCONNECTABLE COMPUTER INFRASTRUCTURE

This application is the National Stage of International Application No. PCT/EP2019/062588, filed May 16, 2019, which claims the benefit of European Patent Application No. EP 18178775.5, filed Jun. 20, 2018. The entire contents of these documents are hereby incorporated herein by reference.

BACKGROUND

The present embodiments relate to connecting a terminal into a region, assigned to a user, of a networkable computer infrastructure.

The "Internet of Things" (IoT) is a concept for networking physically tangible devices that may be spatially separated by any desired distance from one another in principle to one another and therefore allowing the physically tangible devices to cooperate with one another by appropriate communication technologies and protocols. This may be the case, for example, for machines in construction processes where construction systems at different locations inform one another of production progress or of problems that occur at a location and are therefore matched to one another for more efficient utilization of the systems. Systems for regenerative energy production, for example, and energy transmission systems, for example, may likewise communicate with one another in order to control the supply and utilization in the network based on the powers produced at different locations.

An important challenge for networking real devices and for successful connection for utilizing synergies is the creation of a suitable communication protocol in this case. The different devices to be networked that may often be produced by different manufacturers are to provide the other subscribers in the IoT with information in a manner in which the information may be processed for these subscribers. This applies all the more when large systems often use, for different ones of functions, protocols that are given by different standards depending on the function.

In addition, the security of the connection that is inherent in the protocol is an important aspect for a communication protocol for connecting devices to the IoT. It should be provided that only appropriately authorized devices in a back-end of the IoT network gain access to particular functions, with the result that the authentication for verifying this authorization should be as reliable as possible.

A connection of the devices that is as simple and user-friendly as possible, however, is often also desired. A cloud service for specifically implementing the IoT is often subdivided into individual regions that are assigned to specific customers or more generally users. The respective users are intended to have access only to the devices and to the functions provided in the IoT in the assigned region. In this case, users often desire a high degree of flexibility (e.g., for connecting devices to "their" region).

US 2014/0 208 390 A1 proposes, for the purpose of monitoring an industrial automation system by a user, allowing this user to communicate with an OPA UA server via an OPA UA client. The OPA UA server has access to a list of mappings that assign specific users to individual stored application certificates and possibly assign individual authorizations to the users. The user may log into the OPA UA server using his corresponding application certificate in the OPA client and may thus gain access to the authorizations stored for the user in the mapping in the OPA server.

In "Nutzer-Autorisierung an Schutzgeraeten mittels Rollen-und Rechte-Struktur und die Zuweisung dieser mittels Parametriereinrichtung [User authorization on protective devices by means of a role and rights structure and the assignment thereof using a parameterizing device]", IP.COM Journal, Jun. 3, 2008, XP013124895, an internal role and rights structure may be implemented for protective devices for controlling and monitoring electrical energy supply networks in order to allow such a device to access another device, where individual roles are defined by combining rights using a group of objects such as the devices. A login to a device is carried out using a certificate characterizing the corresponding role.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method for connecting a terminal to a region, assigned to a user, of a networkable computer infrastructure that may be carried out as comfortably as possible for the user with the highest possible degree of security is provided.

According to the present embodiments, by a method for connecting a terminal into a region, assigned to a user, of a networkable computer infrastructure that is configured for a plurality of users is provided. A user certificate is created for the region assigned to the user and is made available to the user and/or to the computer infrastructure, where a terminal certificate (e.g., a private terminal certificate) compatible with the user certificate is created based on the user certificate. The terminal certificate is created by the user and/or within that region of the networkable computer infrastructure that is assigned to the user by an appropriate application. The terminal certificate is input to the terminal, where the terminal is registered in the networkable computer infrastructure via a data connection. For the registration, the terminal certificate and/or a password encrypted based on the terminal certificate is/are transmitted from the terminal to the networkable computer infrastructure via the data connection. The terminal is authenticated in the networkable computer infrastructure and, for example, by the networkable computer infrastructure based on a check of compatibility of the transmitted terminal certificate or the transmitted password encrypted based on the terminal certificate with the user certificate. In the event of successful authentication, use of the networkable computer infrastructure in the region assigned to the user is enabled for the terminal.

In this case, the networkable computer infrastructure includes, for example, one or more memories and/or one or more processors or computing means and/or program applications that may be executed on the computing means and may be stored, for example, in the memory devices. In this case, the networkable computer infrastructure is decentralized (e.g., is accessible from a multiplicity of possible spatial locations that may each be at considerable distances from one another). In this case, access may be effected via an Internet connection, for example. In this respect, by virtue of the networking to a subscriber that may be provided, for example, by the terminal, the networkable computer infrastructure may be used from the respective location of the subscriber independently of where the physical components (e.g., memory device and/or processor or computing means) are implemented.

In this case, the networkable computer infrastructure is configured for a plurality of users for example, by respectively assigning corresponding regions to the users. A region that is assigned to a user in the networkable computer infrastructure in this case includes, for example, a delimited memory location in the memory devices and/or the authorization to use and apply particular program applications by the relevant user (e.g., in conjunction with the data stored in his delimited memory location). In this case, the program applications may be stored in a separate memory area of the memory device, with the result that a specific program application may be made available to the processor or computing means for execution in the event of desired access by a specific user (e.g., after a verified authorization of the relevant user for this program application).

The user certificate for the region assigned to the user may be created by an officially recognized certification body. The officially recognized certification body then provides the user and/or the networkable computer infrastructure (e.g., by appropriate interaction with an administrator of the networkable computer infrastructure) with the user certificate in a suitable and, for example, sufficiently secure manner (e.g., via an accordingly encrypted data connection or on a physical data storage medium). As a result, no potentially insecure data transmission is required.

Alternatively, the user certificate may also be created by a corresponding certification body implemented inside the networkable computer infrastructure. In this case, compatibility of the terminal certificate with the user certificate includes, for example, the fact that a message encrypted by the terminal certificate may be decrypted by the user certificate. In this case, for example, the requirement for compatibility, which may be implemented in practice by an appropriate algorithm for creating at least one of the certificates mentioned, may also define a hierarchy to the effect that, for a given user certificate, there may be a plurality of terminal certificates that each differ from one another and are all each compatible with the user certificate per se. This may be implemented in practice, for example, by creating a terminal certificate based on the user certificate (e.g., by a suitable hash function).

The terminal certificate may be input to the terminal separately from the networkable computer infrastructure (e.g., there is no data connection from the terminal to the networkable computer infrastructure at the time at which the terminal certificate is input to the terminal). In this case, the input may be effected, for example, via a wired connection to a USB memory or to a computer that is separate from the networkable computer infrastructure and is equipped with a corresponding storage medium.

For registration of the terminal in the networkable computer infrastructure, the terminal certificate is now transmitted to the networkable computer infrastructure via a data connection, where the networkable computer infrastructure is configured such that, in response to a communication request from a terminal for registration, the terminal certificate is assigned to this communication request (e.g., via a corresponding registration assistant). As an alternative or in addition to the terminal certificate, a password that has been encrypted based on the terminal certificate (e.g., by the terminal itself) may also be transmitted from the terminal to the networkable computer infrastructure via the data connection.

In order to check the compatibility of the transmitted terminal certificate, or the transmitted password encrypted based on the terminal certificate, with the user certificate, a corresponding registration assistant (e.g., implemented as a corresponding program application) may be configured, for example, within the scope of the networkable computer infrastructure. If the terminal and the networkable computer infrastructure communicate within the scope of an MQTT protocol, for example, the assistant may be implemented as an MQTT broker. If the user certificate is made available only to the user himself, but not globally to the entire networkable computer infrastructure, the check is carried out at the level of the region that is assigned to the user and in which the corresponding assistant may also be implemented. Authentication of the terminal includes, for example, determining compatibility of the certificates mentioned during the check.

Enabling use of the networkable computer infrastructure in the region assigned to the user includes, for example, accessing the memory location assigned to the user by the device and using the program applications, for which the user himself has usage authorization within the scope of the networkable computer infrastructure, using the terminal and/or in conjunction with the terminal.

The method makes it possible for the user, after successful certification for the region assigned to him, to himself act as a "certification body" for the individual terminals. As a result, an individual terminal need no longer be certified for a complete networkable computer infrastructure and the corresponding certificate need not be stored there in a complicated manner, but rather, the user is given the opportunity to apply trust for that region of the networkable computer infrastructure that is assigned to him, as established through his certification, to the terminals to be used by appropriate certification.

The terminal certificate may be created by deriving the terminal certificate from the user certificate. This is carried out, for example, by an appropriate algorithm (e.g., a hash function), in which the required compatibility properties of the derived certificate are achieved. This makes it possible for the user to grant access to the region assigned to him, to a terminal classified a priori by him as trusted by accordingly issuing terminal certificates.

According to the present embodiments, the terminal certificate is created by the user and/or within that region of the networkable computer infrastructure that is assigned to the user by an appropriate application. As a result, the user is saved from having to direct a corresponding request to a management unit of the networkable computer infrastructure for creation of the terminal certificate. Rather, the user or a third party classified as trusted by the user may himself create the terminal certificate in that region of the networkable computer infrastructure that is assigned to him. The appropriate application for creating the terminal certificate may be made available to the user in this case by the networkable computer infrastructure via a corresponding authorization.

The terminal certificate may be input to the terminal to a memory of the terminal during manufacture of the terminal, and/or by connecting a non-volatile storage medium, on which the terminal certificate is stored, to the terminal. In this case, the terminal certificate may be input to the terminal in a manner completely separate from the networkable computer infrastructure (e.g., no data connection of any kind between the terminal and the networkable computer infrastructure is used for the transmission). This increases the registration security since the distribution of the terminal certificate may now be assumed to be secure, and there is no need for any further assumptions regarding a possible data connection for security. Specifically, the terminal certificate may be transmitted in this case, for example, by connecting a computer that is separate from the networkable computer infrastructure, to the terminal during the process of manufacturing the terminal. A storage medium (e.g., a USB memory or a CD-ROM), on which the terminal certificate is stored, is now supplied to the computer. The terminal certificate is now input to the terminal by reading the storage medium by the computer and subsequently transmitting the terminal certificate from the computer to the terminal via the data connection.

It is further advantageous if a plurality of subuser regions that are each configured for access by different subusers are provided in the region assigned to the user. In the event of successful authentication, the terminal is enabled for use of the networkable computer infrastructure in a corresponding subuser region. In this case, use in the subuser region may be, for example, the fact that the terminal is enabled only for use of functions for which the relevant subuser has a corresponding authorization. This may include, for example, the fact that, within a region assigned to the user, there may be global functions of the networkable computer infrastructure that are available for all subusers of this region. In this case, the terminal has access to the global functions and, of the functions specific to the individual subusers, has access only to those functions that are enabled in the subuser region. In this case, the terminal certificate may be created by the subuser and/or in the subuser region.

In this case, a subuser certificate compatible with the user certificate may be created for a plurality of subusers of the region assigned to the user based on the user certificate, where these subuser certificates are each incompatible with one another in pairs, and where the terminal certificate is created based on the subuser certificate. In this case, the incompatibility of the subuser certificates in pairs may be, for example, the fact that a message encrypted with a first subuser certificate cannot be decrypted by a second subuser certificate. If the terminal certificate is now created based on a specific subuser certificate, this allows the corresponding subuser to have simple control with respect to registration of the possible terminals thereof in that region of the networkable computer infrastructure that is assigned to the user. The security of the connection between the subuser's terminal and the region assigned to the user may be achieved in this case by the incompatibility of the individual subuser certificates in pairs.

In one configuration, a publish-subscribe protocol is used for communication between the terminal and the networkable computer infrastructure. Communication between a terminal and a networkable computer infrastructure (e.g., a cloud service) may take place in a request-response-based manner. This provides that a permanent connection and corresponding assignment are possible for a specific request from one subscriber of the communication protocol to the other subscriber, which may result in a slowing-down of communication with an increasing number of subscribers and, for example, in the case of asymmetry (e.g., requests from a large number of "clients" to one "server", response from the one "server" to a potentially large number of "clients"). In a communication protocol according to the publish-subscribe principle (e.g., "pub/sub"), a subscriber publishes a message that is provided with a marker and may be read a priori by any desired other subscribers. The other subscribers may now themselves define those markers having messages that would actually like to receive/read (e.g., "subscribe"). This considerably simplifies communication in complex networks. Therefore, a publish-subscribe protocol is advantageous for a low communication overhead (e.g., for a connection of a potentially large number of terminals to the networkable computer infrastructure).

Communication between the terminal and the networkable computer infrastructure may be carried out within the scope of an OPC UA protocol. The OPC UA protocol is a protocol for automated exchange of information between terminals, as may exist in industrial machines, for example. In order to connect a terminal to a networkable computer infrastructure (e.g., to a cloud service), within the scope of the OPC UA protocol, the proposed method is particularly advantageous since the protocol itself does not provide any standard for securely connecting terminals. This defect may now be overcome with the present method.

It is further advantageous if the terminal is registered in the networkable computer infrastructure using a login using a login ID (e.g., a public login ID) that is specific to the terminal and a password (e.g., a private password). The terminal certificate is used as the password, or the password is derived from the terminal certificate such that the password is compatible with the user certificate. For example, the login ID may be provided in this case by a JSON web token that is encrypted with the terminal certificate or with a password derived therefrom while maintaining the compatibility with the user certificate.

A cloud service may be used as the networkable computer infrastructure, where a tenant in the cloud service is used as the region assigned to the user. In this case, a cloud service is a networkable computer infrastructure that may be configured such that the networkable computer infrastructure may be reached globally, substantially without spatial restriction, via a conventional Internet connection. On account of the increasing use of cloud services for networking terminals (e.g., in the industrial environment), the method is particularly suitable for this purpose.

The terminal may be registered via a registration point configured and provided for this purpose in the networkable computer infrastructure, where the registration point of the networkable computer infrastructure assigns an access marker to the terminal after successful authentication. Using this access marker, the terminal gains access to that region of the networkable computer infrastructure that is assigned to the user. In this case, a registration point may be virtually implemented as a corresponding program application. In this case, the access marker may be provided by a corresponding token that may be present in a suitable file format. The region assigned to the user may be accessed in this case only by the terminals that have been assigned the access marker.

The present embodiments also provide a networkable computer infrastructure including a plurality of regions that are each assigned to different users, a number of access points for setting up at least one data connection to a terminal (e.g., an external terminal; a terminal that does not belong to the networkable computer infrastructure), a non-volatile memory, and a processor.

In this case, a region assigned to a user is configured such that a terminal certificate is generated there based on a provided user certificate assigned to the user by an appropriate application. In this case, the processor is configured to check an identifier, which is transmitted from a terminal to the networkable computer infrastructure by a data connection set up via an access point, for compatibility with the user certificate stored in the non-volatile memory and, if compatibility of the identifier with the user certificate is determined, to enable use of the networkable computer infrastructure for the terminal in the region assigned to the corresponding user. The advantages stated for the method and corresponding developments may be analogously applied to the networkable computer infrastructure.

According to the present embodiments, a terminal certificate according to the above-described method or a password encrypted with the terminal certificate is provided as the identifier. The networkable computer infrastructure may be in the form of a cloud service.

BRIEF DESCRIPTION OF THE DRAWINGS

FIG. 1 schematically shows a block diagram of one embodiment of a method for connecting a terminal into a networkable computer infrastructure.

DETAILED DESCRIPTION

FIG. 1 schematically illustrates a block diagram of one embodiment of a method that is used to connect a terminal 1 to a networkable computer infrastructure 2. In the present case, the networkable computer infrastructure 2 is provided by, for example, a cloud service that is structurally divided into different regions 4 that are each assigned to different users 6. This includes, for example, memory areas in the memory location of the networkable computer infrastructure 2 that are separate from one another and possibly also access to different functions and/or applications of the networkable computer infrastructure 2 for the regions 4 assigned to different users. A region 4a that is assigned to a specific user 6a is divided in this case into a plurality of subuser regions 8a-d that are each configured for access by different subusers 10a-d.

Such a structure may be provided, for example, in the situation in which a cloud service provider provides a cloud service (e.g., the networkable computer infrastructure 2) generally to a plurality of companies that are provided by the users 6 in the present case, and assigns corresponding regions 4 to the plurality of companies. If one of these companies is now provided, for example, by a manufacturer of machines and systems, the operation of which may be monitored in a special manner for maintenance, the manufacturer of the systems, as the user 6, may provide, in an assigned region 4 of the networkable computer infrastructure 2, the subuser regions 8a-d for the subusers 10a-d provided by the operators of the systems belonging to the user 6a. In this case, the different subusers 10a-d each have access only to the functions relevant to own systems in each case within the scope of the networkable computer infrastructure 2.

A specific subuser 10a would now like to connect the terminal 1 to the networkable computer infrastructure 2 for use of the functions of the networkable computer infrastructure 2. In this case, the terminal 1 may not be based on the device standard of the user 6a, but rather may be provided, for example, by an additional measuring device for operating parameters of the systems belonging to the user 6a. For this purpose, a digital user certificate 12a is stored in the region 4a assigned to the user 6a. In this case, the user certificate 12a may be issued, for example, by an officially recognized certification body. Based on the user certificate 12a, the user 6a creates a corresponding subuser certificate 14a-d in each case for each of the subusers 10a-d. The subuser certificates 14a-d are each compatible with the user certificate 12a. Compatibility of the relevant certificates includes, for example, the fact that a message encrypted by the hierarchically subordinate certificate (e.g., one of the subuser certificates 14a-d) may be decrypted by the hierarchically higher-level certificate (e.g., the user certificate 12a). In this case, the subuser certificates 14a-d may be derived, for example, from the user certificate 12a by a suitable hash function.

The subuser 10a is therefore in possession of the subuser certificate 14a. The subuser 10a (e.g., based on a suitable hash function) may now derive a terminal certificate 16a from this subuser certificate 14a. The terminal certificate 16a is compatible with the subuser certificate 14a and, for example, with the user certificate 12a in the manner that has already been described.

The terminal 1 that is in the possession of the user 10a is intended to be connected, for communication, to the networked computer infrastructure 2 via an OPC UA pub/sub protocol. For this purpose, the terminal certificate 16a is stored on a data storage medium 18 and is transmitted from the subuser 10a to the terminal 1. The data storage medium 18 may be, for example, in the form of a USB memory, from which a wired data connection is set up to the terminal 1, via which data connection the terminal certificate 16a is transmitted. The terminal 1 is now connected to an access point 22 of the virtual computer infrastructure 2 via a data connection 20. The access point 22 is connected to an MQTT broker as a registration point 23, to which the terminal 1 now transmits a login ID 24, and confirms this using the terminal certificate 16a as a password. Alternatively, the login ID 24 may include a JSON web token that was encrypted using the terminal certificate 16a.

In the MQTT broker, a check is carried out in order to determine whether the terminal certificate 16a transmitted by the terminal 1 is compatible with the user certificate 12a. If this is the case, an access marker 26 in the form of an access token is assigned to the terminal 1. The terminal gains access to those functions of the networkable computer infrastructure 2 that are enabled for the subuser 10a in the subuser region 8a by the access marker 26 (e.g., to the storage location of the subuser region and to the program applications of the region 6a for which the subuser 8a has authorization).

Although the invention has been described and illustrated more specifically in detail using the exemplary embodiments, the invention is not restricted by the exemplary embodiments. Other variations may be derived therefrom by a person skilled in the art without departing from the scope of protection of the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for connecting a terminal into a region, assigned to a user, of a networkable computer infrastructure that is configured for a plurality of users, the method comprising:

creating a user certificate for the region assigned to the user;

making the user certificate available to the user, the networkable computer infrastructure, or the user and the networkable computer infrastructure;

creating a terminal certificate compatible with the user certificate, the creating of the terminal certificate being based on the user certificate by the user, within a region of the networkable computer infrastructure that is assigned to the user by an appropriate application, or a combination thereof, inputting the terminal certificate to the terminal;

registering the terminal in the networkable computer infrastructure via a data connection;

for the registration, transmitting the terminal certificate, a password encrypted based on the terminal certificate, or a combination thereof from the terminal to the networkable computer infrastructure via the data connection;

authenticating the terminal in the networkable computer infrastructure based on a check of compatibility of the transmitted terminal certificate or the transmitted password encrypted based on the terminal certificate with the user certificate; and enabling, in the event of successful authentication, use of the networkable computer infrastructure in the region assigned to the user for the terminal;

wherein creating the terminal certificate comprises deriving the terminal certificate from the user certificate.

2. The method of claim 1, further comprising inputting the terminal certificate to the terminal to a memory of the terminal during manufacture of the terminal, by connecting a non-volatile storage medium, on which the terminal certificate is stored, to the terminal, or a combination thereof.

3. The method of claim 1, wherein a plurality of subuser regions that are each configured for access by different subusers are provided in the region assigned to the user, and wherein, in the event of successful authentication, the terminal is enabled for use of the networkable computer infrastructure in a corresponding subuser region.

4. The method of claim 3, wherein a subuser certificate compatible with the user certificate is created for a plurality of subusers of the region of the networkable computer infrastructure that is assigned to the user in each case based on the user certificate, wherein the subuser certificates are each incompatible with one another in pairs, and wherein the terminal certificate of a subuser is created based on the subuser certificate of the subuser.

5. The method of claim 1, wherein a publish-subscribe protocol is used for communication between the terminal and the networkable computer infrastructure.

6. The method of claim 1, wherein the terminal communicates with the networkable computer infrastructure within the scope of an Open Platform Communications Unified Architechture (OPC UA) protocol.

7. The method of claim 1, wherein the terminal is registered in the networkable computer infrastructure by a login using a login identification (ID) specific to the terminal and a password, and wherein the terminal certificate is used as the password, or the password is derived from the terminal certificate such that the password is compatible with the user certificate.

8. The method of claim 1, wherein a cloud service is used as the networkable computer infrastructure, and wherein a tenant in the cloud service is used as the region assigned to the user.

9. The method of claim 1, wherein the terminal is registered via a registration point configured and provided for this purpose in the networkable computer infrastructure, and wherein the registration point of the networkable computer infrastructure assigns an access marker to the terminal after successful authentication, wherein the terminal gains access to the region of the networkable computer infrastructure that is assigned to the user by the access marker.

10. A networkable computer infrastructure comprising:

a plurality of regions that are each assigned to different users;

a number of access points for setting up at least one data connection to a terminal in each case;

a non-volatile memory; and a processor, wherein a region assigned to a user is configured such that a terminal certificate is generated there based on a provided user certificate assigned to the user by an appropriate application, the generation of the terminal certificate including derivation of the terminal certificate from the user certificate, the terminal certificate being inputable to the terminal, wherein the processor is configured to:

register the terminal in the networkable computer infrastructure via a data connection, the registration of the terminal in the networkable computer infrastructure comprising reception of the terminal certificate, a password encrypted based on the terminal certificate, or a combination thereof from the terminal via the data connection;

authenticate the terminal in the networkable computer infrastructure based on a check of compatibility of the received terminal certificate or the received password encrypted based on the terminal certificate with the user certificate stored in the non-volatile memory; and when the authentication is successful, enable use of the networkable computer infrastructure for the terminal in the region assigned to the corresponding user wherein.

11. The networkable computer infrastructure of claim 10, wherein the networkable computer infrastructure is in the form of a cloud service.

* * * * *